Oct. 30, 1923. Re. 15,710

N. R. FORSSBLAD

ELECTRIC STEAM AND HOT WATER BOILER

Original Filed June 10, 1920

Inventor
N. R. Forssblad
By Marks & Clerk Attys

Reissued Oct. 30, 1923. Re. 15,710

UNITED STATES PATENT OFFICE.

NILS RICHARD FORSSBLAD, OF VASTERAS, SWEDEN.

ELECTRIC STEAM AND HOT-WATER BOILER.

Original No. 1,386,487, dated August 2, 1921, Serial No. 388,032, filed June 10, 1920. Application for reissue filed August 29, 1922. Serial No. 585,050.

*To all whom it may concern:*

Be it known that I, NILS RICHARD FORSSBLAD, a subject of the King of Sweden, residing at Vasteras, Sweden, have invented certain new and useful Improvements in Electric Steam and Hot-Water Boilers, of which the following is a specification.

The present invention relates to such steam or hot water boilers in which the steam is produced by an electrical current passing directly between electrodes submerged in the water.

In all boilers of the type herein considered the electrodes will have to be surrounded by tubes of some insulating material in order to prevent direct short circuits between the electrodes. The control of the output, which is generally wanted, was heretofore obtained mostly by disconnecting one or more electrodes by means of a plurality of switches arranged outside the boiler.

According to the present invention the control of the output is effected by raising or lowering the insulating tubes surrounding the electrodes, whereby the length and thereby the resistance of the water columns within the tubes is varied. By this arrangement the output of the boiler may thus be varied within certain limits, without changing the number of electrodes connected in circuit. Therefore, the number of electrodes answering certain requirements for control need not be as large as in the constructions heretofore employed, and this, evidently, contributes to a reduction of the costs for the boiler as compared with prior systems.

Figure 1:
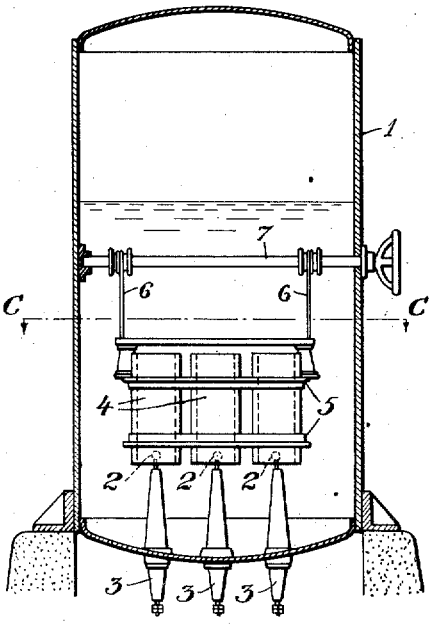
Figure 2:
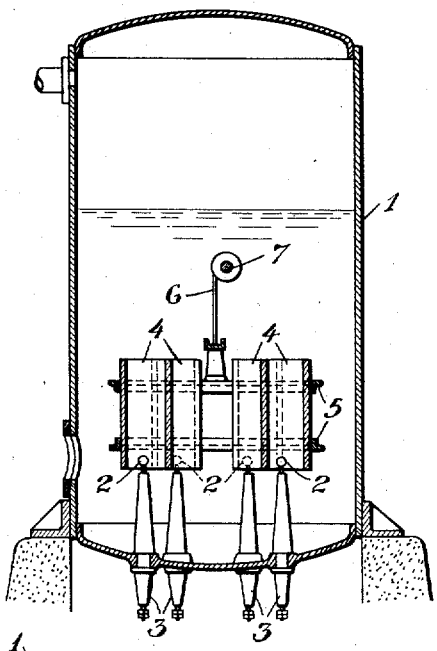
Figure 4:
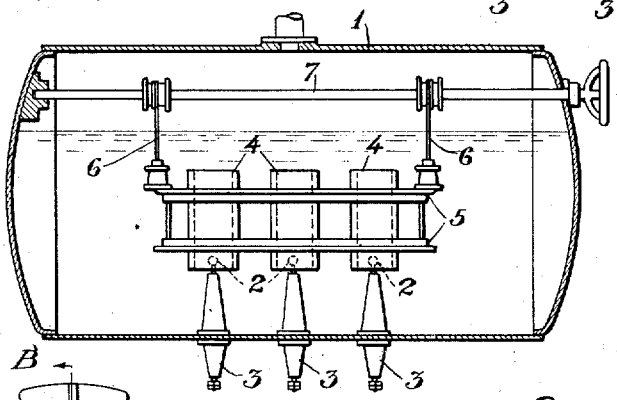
Figure 3:
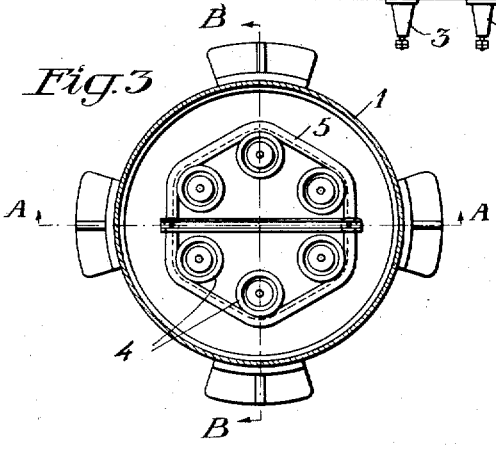
Figure 5:
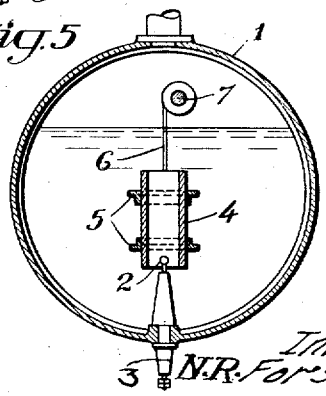

Two embodiments of the boiler are illustrated in the accompanying drawings, wherein:

Figs. 1–3 show an upright boiler with six electrodes, while Figs. 4 and 5 disclose a horizontal boiler with three electrodes. Fig. 1 is a vertical section on line A—A, and Fig. 2 a vertical section on line B—B in Fig. 3. Fig. 3 is a horizontal section on line C—C in Fig. 1. Figs. 4 and 5 are similar longitudinal and cross sections respectively.

The shell of the boiler is designated by 1. The numeral 2 denotes the electrodes, 3 the inlet ducts, 4 the insulating tubes and 5 a contrivance for keeping these tubes together. 6 are ropes by means of which the tubes may be raised and 7 is a hoisting device for the ropes, such device consisting of a rotatable shaft, and operating means in the form of a hand wheel. Arrangements other than the one herein disclosed may obviously be used for raising and lowering the pipes 4, such arrangements comprising, for example, devices operated by tooth racks or levers.

The mode of operation of the boiler is as follows: the electrical current, preferably a multiphase alternating current, is led into the boiler at the lower side thereof through the inlet ducts 3 and to the electrodes 2, and the current then passes through the water between the electrodes. According as the tubes 4 are raised or lowered by means of the ropes 6 and the shaft 7, the resistance of the water between the electrodes varies, and consequently also the output of the boiler varies.

The electrodes may be of any form suitable for the purpose but preferably they are ball-shaped. Generally, they should have a relatively short length in the longitudinal direction of the surrounding tube.

The tubes are preferably open at both ends, so as to allow of a free circulation of the water and to allow the circuit to be closed in both directions through the tube.

The same arrangements for control may evidently be used also in boilers employed only for the purpose of heating water.

I claim as my invention:

1. In an electrical steam or hot-water boiler, a number of submerged electrodes introduced through the bottom of the boiler, and a submerged insulating tube surrounding each of said electrodes, said tube being open at both ends.

2. In an electrical steam or hot-water boiler the combination of a number of submerged electrodes introduced through the bottom of the boiler, a submerged insulating tube surrounding each of said electrodes, said tube being in open communication with the water at both ends, and means for displacing the tubes in a longitudinal direction.

3. In an electrical steam or hot water boiler, the combination of a plurality of submerged electrodes introduced through the bottom of the boiler and a submerged insulating tube surrounding each of said electrodes, said tube being in open communication with the water at both ends.

NILS RICHARD FORSSBLAD.